(12) United States Patent
Majumder et al.

(10) Patent No.: US 10,705,903 B2
(45) Date of Patent: Jul. 7, 2020

(54) IDENTIFYING SYSTEM FAILURES BY ACCESSING PRIOR TROUBLESHOOTING INFORMATION

(71) Applicant: Dell Products L.P., Round Rock, TX (US)

(72) Inventors: Prabir Majumder, Plano, TX (US); Jeffrey S. Vah, Austin, TX (US); Anand Lakshmanan, Cedar Park, TX (US); Fadi M. Taffal, Pflugerville, TX (US); Brian T. Martin, Austin, TX (US); Gayathri M. Rau, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 15/879,750

(22) Filed: Jan. 25, 2018

(65) Prior Publication Data
US 2019/0227861 A1  Jul. 25, 2019

(51) Int. Cl.
| G06F 11/00 | (2006.01) |
| G06F 11/07 | (2006.01) |
| G06Q 30/00 | (2012.01) |
| G06N 20/00 | (2019.01) |
| G06N 5/00 | (2006.01) |
| G06F 40/20 | (2020.01) |
| G06N 5/04 | (2006.01) |

(52) U.S. Cl.
CPC ............ *G06F 11/079* (2013.01); *G06F 40/20* (2020.01); *G06N 5/003* (2013.01); *G06N 20/00* (2019.01); *G06Q 30/016* (2013.01); *G06F 2216/03* (2013.01); *G06N 5/046* (2013.01)

(58) Field of Classification Search
CPC .... G06F 11/079; G06F 17/27; G06F 2216/03; G06N 20/00; G06Q 30/016
USPC .......................................................... 714/37
See application file for complete search history.

(56) References Cited

U.S. PATENT DOCUMENTS

| 5,253,184 A * | 10/1993 | Kleinschnitz | ............ G07C 3/00 |
| | | | 702/184 |
| 2004/0153823 A1* | 8/2004 | Ansari | ................. G06F 11/0715 |
| | | | 714/38.14 |
| 2004/0164206 A1* | 8/2004 | Jammu | .................. B60L 3/0023 |
| | | | 246/167 R |
| 2011/0276498 A1* | 11/2011 | Madhok | ................. G06Q 10/00 |
| | | | 705/302 |

(Continued)

OTHER PUBLICATIONS

Wikipedia "Commodity" page, retrieved from https://en.wikipedia.org/wiki/Commodity (Year: 2019).*

(Continued)

*Primary Examiner* — Yair Leibovich
(74) *Attorney, Agent, or Firm* — Terrile, Cannatti & Chambers; Stephen A. Terrile (57) ABSTRACT

A system, method, and computer-readable medium for performing a system failure identification operation, comprising: receiving information regarding a device a repair depot; performing a depot triage process on the device, the depot triage recording possible causal factors contributing to failure of the device; determining suspected failures associated with the device based upon symptoms exhibited by the device; and, correlating the suspected failures with commodities for use in repairing the device.

14 Claims, 6 Drawing Sheets

(56) References Cited

U.S. PATENT DOCUMENTS

| | | | | |
|---|---|---|---|---|
| 2012/0066547 | A1* | 3/2012 | Gilbert | H04L 41/065 714/26 |
| 2012/0131557 | A1* | 5/2012 | Davies | G06F 11/079 717/125 |
| 2014/0324276 | A1* | 10/2014 | Weaks | G06Q 10/063 701/31.4 |
| 2016/0055043 | A1* | 2/2016 | Chikabelapur | G06F 11/079 714/37 |

OTHER PUBLICATIONS

Wikipedia expert system page, retrieved from https://en.wikipedia.org/wiki/Expert_system (Year: 2020).*

* cited by examiner

IDENTIFYING SYSTEM FAILURES BY ACCESSING PRIOR TROUBLESHOOTING INFORMATION

BACKGROUND OF THE INVENTION

Field of the Invention

The present invention relates to information handling systems. More specifically, embodiments of the invention relate to identifying system failures by accessing prior troubleshooting information.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for performing a system failure identification operation, comprising: receiving information regarding a device a repair depot; performing a depot triage process on the device, the depot triage recording possible causal factors contributing to failure of the device; determining suspected failures associated with the device based upon symptoms exhibited by the device; and, correlating the suspected failures with commodities for use in repairing the device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing a system failure identification operation. In certain embodiments, the system failure identification operation analyzes onboard telemetry data, global repair insights, and customer facing symptoms and complaints to recommend the most probable repair solution. In certain embodiments, the system failure identification operation provides an end-to-end method for accurately identifying system failures. In certain embodiments, the system failure identification operation applies a machine learning model to cloud-based data to recommend the most probable repair solution.

When a faulty device (i.e., a system or component) arrives at a repair depot, depot professionals perform diagnostic tests, identify possible causal factors, record the possible causal factors and assess the system or component for an appropriate determination of symptoms so that appropriate commodities may be provided to the customer for a possible repair. In certain embodiments, the possible causal factors are identified as suspected failures. Often the identification of possible causal factors is based on technical support personnel accessing prior troubleshooting steps. In certain embodiments, these prior troubleshooting steps are often accessed via a function key (e.g., F9) which provides a list of comments and customer complaints. In various embodiments, the determination of symptoms can include identification of spillage, power issues, battery issues, etc.

In certain embodiments, the system failure identification operation includes a depot triage process. More specifically, when performing a depot triage process, technical support personnel record possible causal factors contributing to the device failure. In certain embodiments, the possible causal factors contributing to the device failure are accessed via a function command. Next, repair depot personnel determine suspected failures using the possible causal factors and a visual assessment of the device. Next, the repair depot personnel correlate the symptoms with appropriate commodities to be provided to the customer for a possible repair.

In certain embodiments, the system failure identification operation leverages text mining analytics to discover any underlying patterns in identified possible causal factors and customer complaints. In certain embodiments, the system failure identification operation uses the text mining analytics to identify specific symptoms. In certain embodiments, the system failure identification operation uses the text mining analytics to correlate specifically identified systems with appropriate commodities to resolve the detected defect.

Such a system failure identification operation avoids manual dependence and leverages data science capability to drive intelligence in parsing (e.g., the F9 comments), classification (e.g., of symptoms) and correlation (e.g., with part commodities). In certain embodiments, the system failure identification operation characterizes new failures and then matches the characterized failures against previous cases to pinpoint the cause of failure and continually learn. In certain embodiments, the system failure identification operation accesses a repair database having years of repair data. In certain embodiments, the system failure identification operation performs a multi-stage data check with validation of successful system repair but also validation of part third party repair (TPR) outcome.

In certain embodiments, the system failure identification operation uses a dedicated machine-learning engine that is coupled to a system failure identification user-interface to direct the repair operations. ML algorithm considers the historical data from all global DELL repair centers to formulate a consensus. The machine learning-engine provides information to the system failure identification user interface to allow the system failure identification user interface to provide information regarding symptom classification, correlation of symptoms with commodities and commodity recommendations to assist in directing repair operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
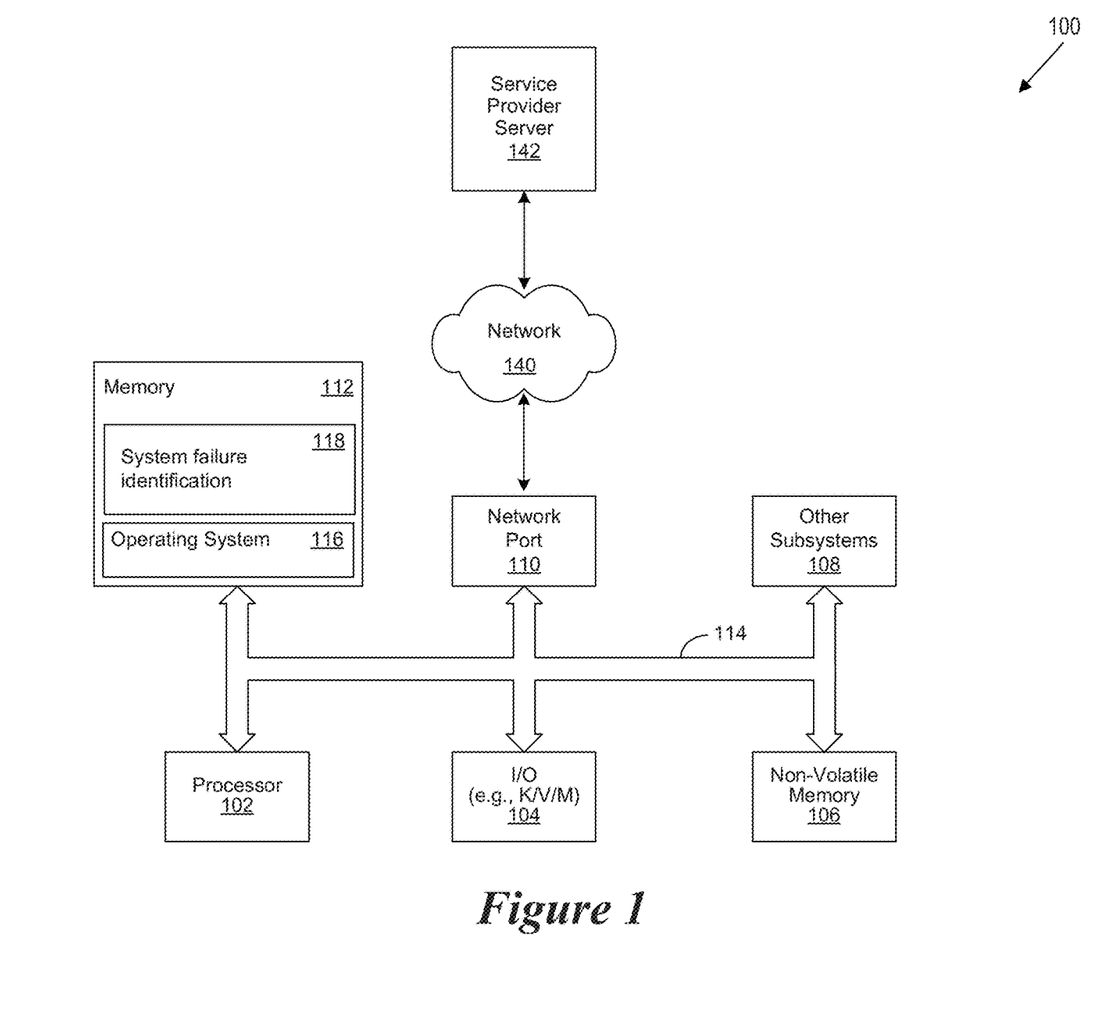
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a system failure identification system 118.

The system failure identification system 118 performs a system failure identification operation. The system failure identification operation improves processor efficiency (and thus the efficiency of the information handling system 100) facilitating system failure identification. In certain embodiments, the system failure identification operation can improve the accuracy of observed failures by 90% on 85% of failures observed during operation of an information handling system. As will be appreciated, once the information handling system 100 is configured to perform the system failure identification operation, the information handling system 100 becomes a specialized computing device specifically configured to perform the system failure identification operation and is not a general purpose computing device. Moreover, the implementation of the system failure identification operation on the information handling system 100 improves the functionality of the information handling system and provides a useful and concrete result of automatically identifying system failure information for use in attempting to repair information handling systems. In certain embodiments, the system failure identification operation results in a 33/% reduction in system diagnosis time when performing a repair operation.

Figure 2:
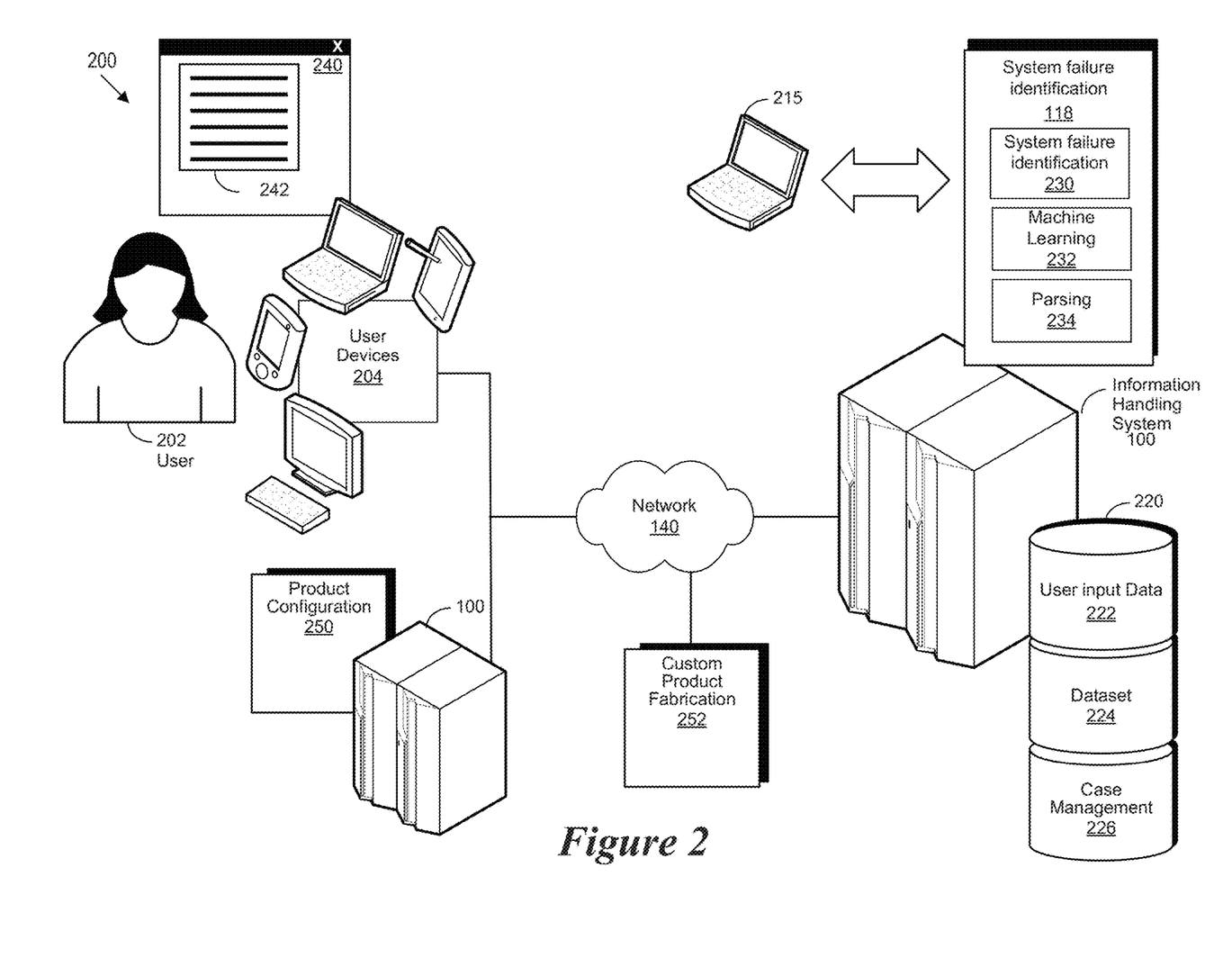
FIG. 2 shows a block diagram of a customer service interaction estimation environment.

FIG. 2 is a block diagram of a system failure identification environment 200 implemented in accordance with an embodiment of the invention. The system failure identification environment 200 includes a system failure identification system 118 as well as system failure identification system 210. The system failure identification system 118 interacts with a potentially faulty device 215. In certain embodiments, the potentially faulty device includes one or more of an information handling system, a component of an information handling system and a component associated with an information handling system.

In various embodiments, a user 202 generates a system failure identification request which is provided to the system failure identification system 118. In various embodiments, a system failure identification system 118 executes on a hardware processor of an information handling system 100. In various embodiments, the user 202 may use a user device 204 to interact with the system failure identification system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a system failure identification user interface 240. In various embodiments, the system failure identification user interface 240 presents a graphical representation 242 of system failure identification information which are automatically generated in response to interaction with the system failure identification system 118. In various embodiments, the user device 204 is used to exchange information between the user 202 and the system failure identification system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the system failure identification system 118 includes a system failure identification module 230 which performs a system failure identification operation. The system failure identification system 118 also includes a machine learning engine 232 which interacts with the system failure identification module 230 when performing the system failure identification operation. In certain embodiments, the system failure identification system 118 also includes a parsing engine 234 which interacts with the system failure identification module 230 when performing the system failure identification operation.

In various embodiments, the system failure identification environment 200 includes a storage repository 220. The storage repository may be local to the system executing the system failure identification system 118 or may be executed remotely. In various embodiments, the storage repository includes one or more of a user input data repository 222, a dataset repository 224 and a case management repository 226. In certain embodiments, the case management repository 226 stores fault data which can include prior troubleshooting steps. In certain embodiments, the fault data is accessed by a technician via a function key (e.g., a F9 function key). In certain embodiments, data stored within the case management repository 226 includes fault data (e.g., comments such as prior troubleshooting information) which is not necessarily separated into words or sentences (e.g., a no power condition might be listed as nopow, Nopow, nopowe, Nopowe, etc.). When the fault data is not separated into words or sentences, the parsing engine 234 reads the fault data, splits the fault data into combinations of alphabet words (e.g., 4-20 alphabet words) and generates a table with key words and frequency.

In various embodiments, the system failure identification system 118 interacts with a product configuration system 250 which may be executing on a separate information handling system 100. In various embodiments, the product configuration system 250 interacts with a custom product fabrication system 252. In various embodiments, the custom product fabrication system 252 fabricates products to include components to address issues identified using the system failure identification system 118. In various embodiments, the system failure identification user interface 240 may be presented via a website. In various embodiments, the website is provided by one or more of the system failure identification system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Figure 3:
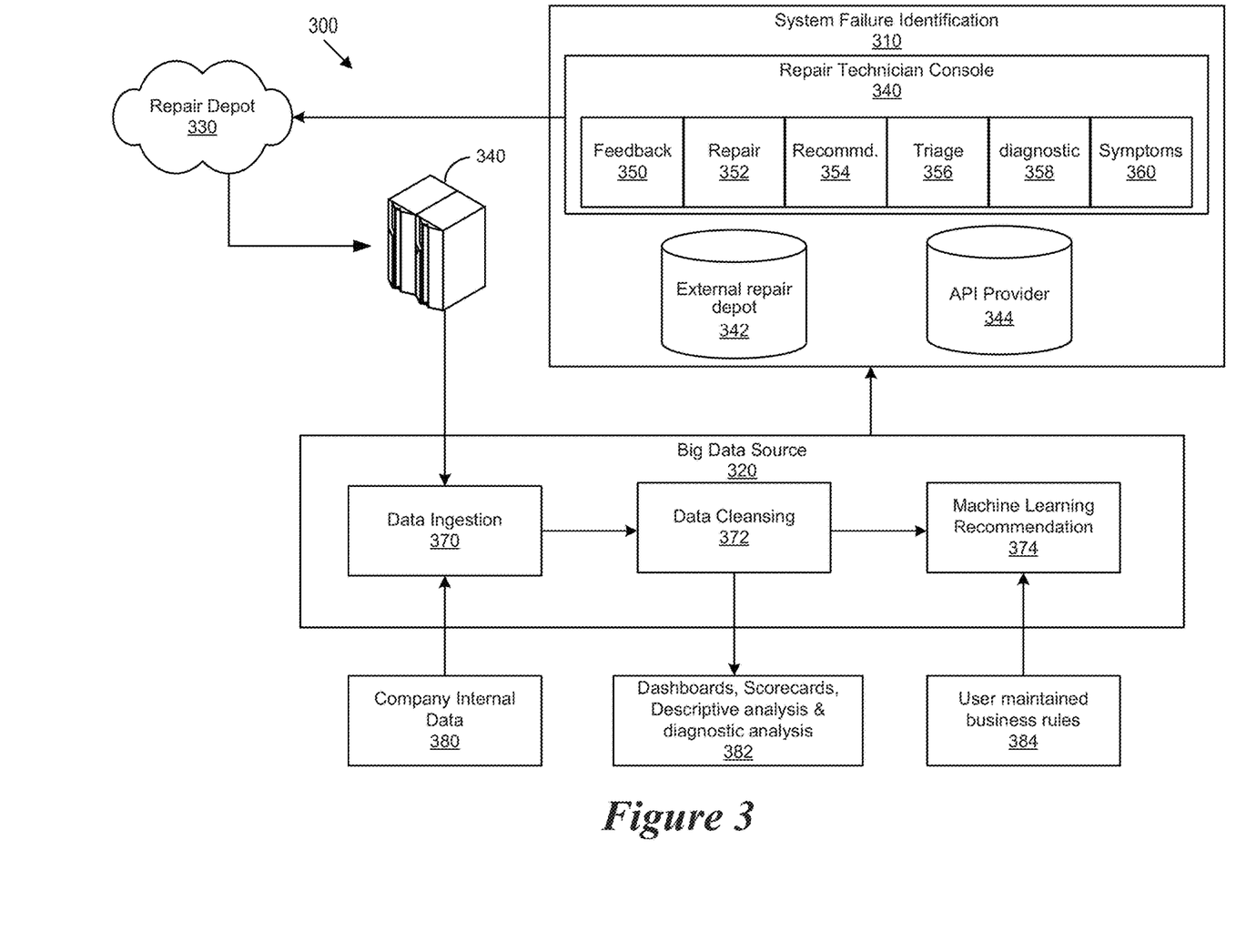
FIG. 3 shows a functional block diagram of a system failure identification environment when performing a failure identification operation.

Referring to FIG. 3 a functional block diagram of a system failure identification environment 300 when performing a failure identification operation is shown. More specifically, a system failure identification system 310 receives information from a big data source 320 such as a big data lake. The system failure identification system 310 provides repair information to a repair depot 330, which may be managed by a third party repair organization. The repair depot 330 then provides repair files to a company file server 340 which then provides repair information to the big data source 320.

In certain embodiments, the system failure identification system 310 includes a repair technician console 340 as well as an external repair depot repository 342 and an application program interface (API) provider repository 344. The external repair depot repository 342 receives repair files with model feedback from the repair technician console 340 and stores repair model output data as well as repair business rules. The API provider repository stores model APIs. In certain embodiments the model APIs include one or more of R model APIs and Python model APIs. In certain embodiments, the repair technician console 340 may be stored and executed within a cloud service such as the Amazon Web Services (AWS) cloud services. In certain embodiments, the external repair depot repository 342 may be stored within a cloud service such as the AWS cloud service. In certain embodiments, the API provider repository 344 may be stored within a cloud service such as the AWS cloud service.

The repair technician console 340 includes a feedback module 350, a repair module 252, a recommendations module 354, a triage module 356, a diagnostics module 358 and a symptoms module 360. The big data source 320 includes a data ingestion portion 370, a data cleansing, text parsing and data mining portion 372 and a machine learning recommendation system 374. In certain embodiments, the data ingestion portion 370 ingests data into a Hadoop Distributed File System (HDFS). In certain embodiments, the machine learning recommendation system 374 uses decision trees when performing the learning and recommending. The big data source 320 receives company internal data 380 to the data ingestion portion 370. The big data source 320 provides dashboards, scorecards, descriptive analysis information and diagnostic analysis information 382 which are used when performing a system failure identification operation. In certain embodiments, the machine learning recommendation system 374 may receive user maintained business rules 384 which are potentially used to override the learning and recommending provided by the machine learning recommendation system 374. In certain embodiments, the company internal data 380 includes fault data (e.g, comments) which is not necessarily separated into words or sentences (e.g., a no power condition might be listed as nopow, Nopow, nopowe, Nopowe, etc.). When the fault data is not separated into words or sentences, the data cleansing, text parsing and data mining portion 272 reads the comments, splits the comments in combinations of alphabet words and generates a table with key words and frequency.

Figure 4:
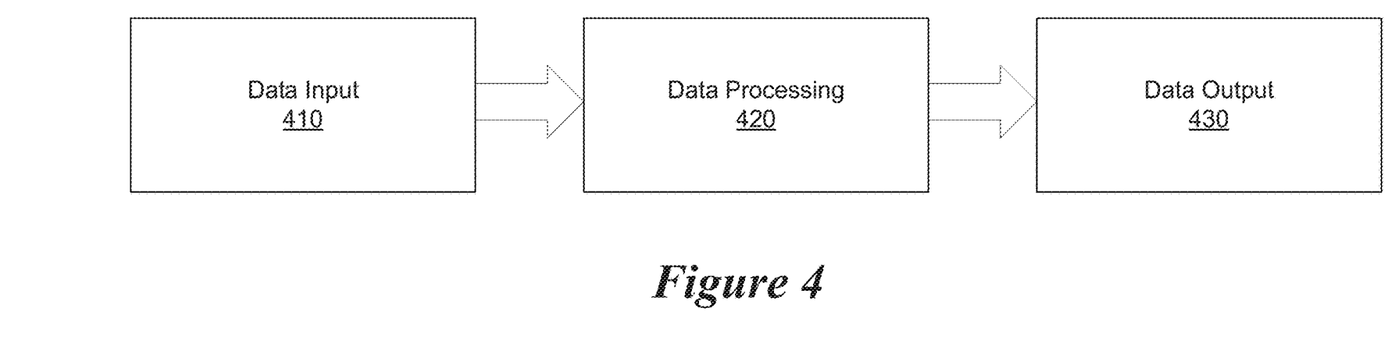
FIG. 4 shows a block diagram of a data model of a failure identification system.

Referring to FIG. 4, a block diagram of a data model 400 of a failure identification system is shown. More specifically, the data model 400 includes a data input portion 410, a data processing portion 420 and a data output portion 430. The data input portion 410 receives inputs regarding existing symptoms, inputs regarding historical failures and inputs regarding similar failure model trends. The data processing portion 420 includes data to filter input sources, data to identify customer complaints, data to optimize data utilization and decode and data to score possible solutions. The data output portion 430 provides data to report possible solutions, data for use by a repair console, data for standardized Verified Field Incident Rate (VFIR) reporting and data for performing optimizations.

Figure 5:
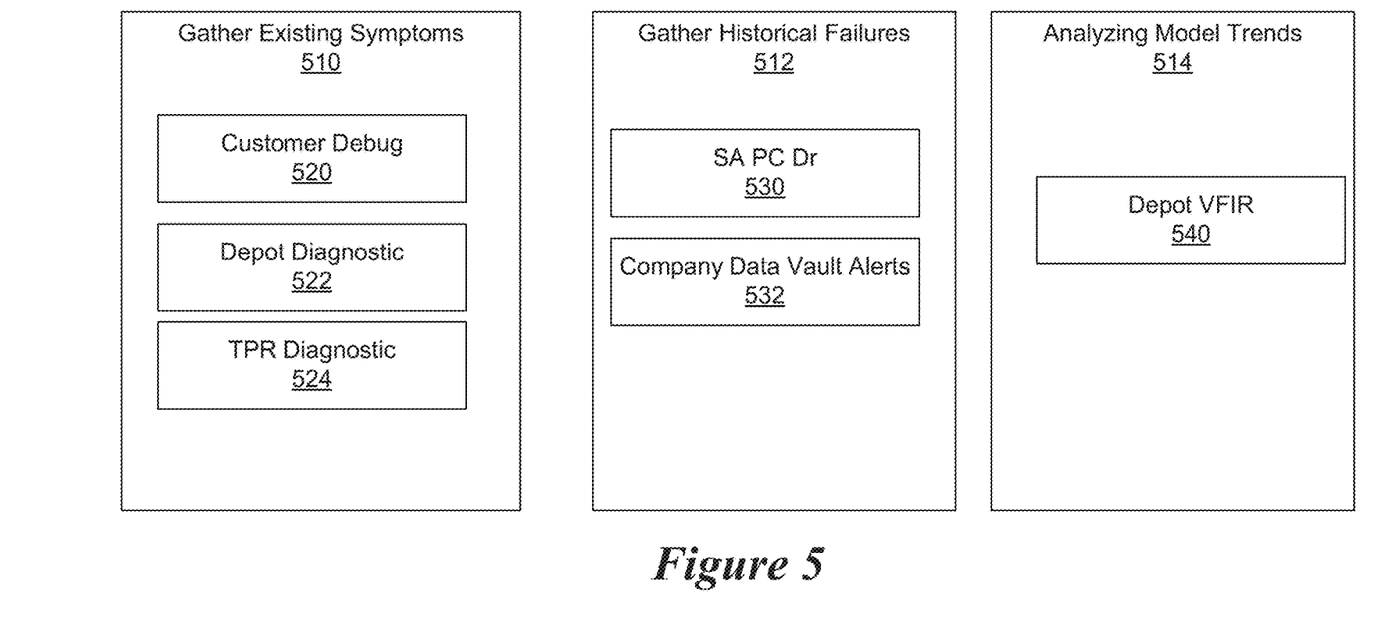
FIG. 5 shows a block diagram of input definitions of a failure identification operation.

Referring to FIG. 5, a block diagram of input definitions 500 of a failure identification operation is shown. More specifically, the input definitions 500 include input definitions for gathering existing symptoms 510, for gathering historical failures 512 and for analyzing model trends 514.

The input definitions for gathering existing symptoms 510 include customer debug input definitions 520, depot diagnostic definitions 522 and Third-Party Repair (TPR) diagnostic definitions. The input definitions for gathering historical failures 512 include Support Assist PC Doctor (SA PC Dr) input definitions 530 and Company (e.g., Dell) Data Vault (DDV) alerts input definitions 532. The input definitions for analyzing model trends 514 include depot Verified Field Incident Rate (VFIR) data input definitions 540.

Figure 6:
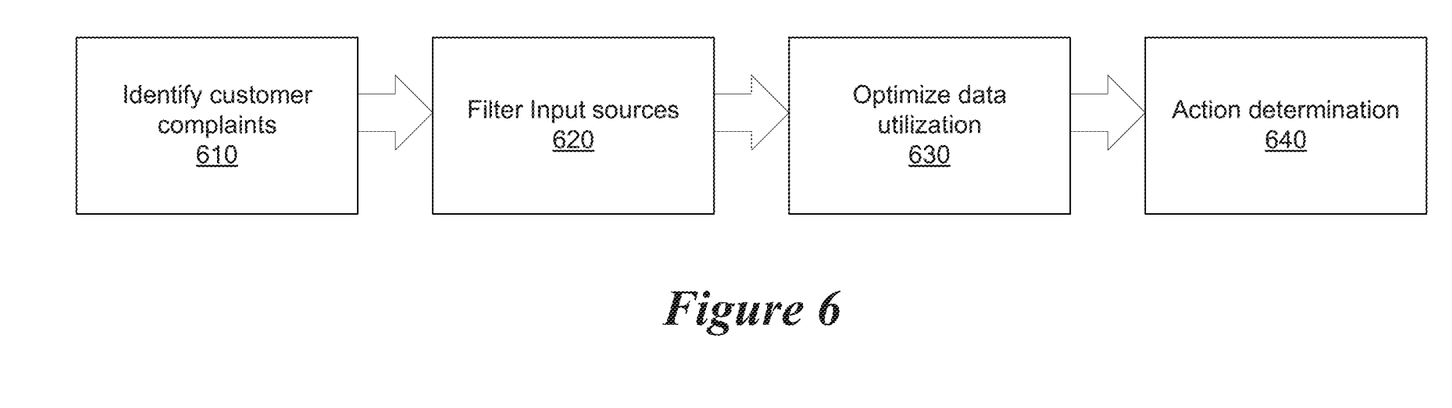
FIG. 6 shows a flow chart of a data processing flow of a system failure identification operation.

Referring to FIG. 6, a flow chart of a data processing flow 600 of a system failure identification operation is shown. More specifically, the data processing flow starts at step 610 by identifying customer complaints. When identifying customer complaints the system failure identification operation exposes potentially unknown issues. Next, at step 620 the data processing flow filters input sources. When filtering input sources, the system failure identification operation removes redundant text such as "replace parts as necessary" and evaluates data reliability. When evaluating data reliability the system failure identification operation can add weighting to certain key words that represent high-level failure symptoms such as NO POWER, NO BOOT, BLANK SCREEN, etc.

Next, at step 630 the data processing flow optimizes data utilization. When optimizing data utilization the system failure identification operation performs a confidence level iteration review that involves an estimation of degree of dependence on a solution. Next, at step 640 the data processing flow makes a determination on what actions to take in response to the identified system failures. In certain embodiments, the system failure identification operation ranks probable solutions to the identified system failures.

Figure 7:
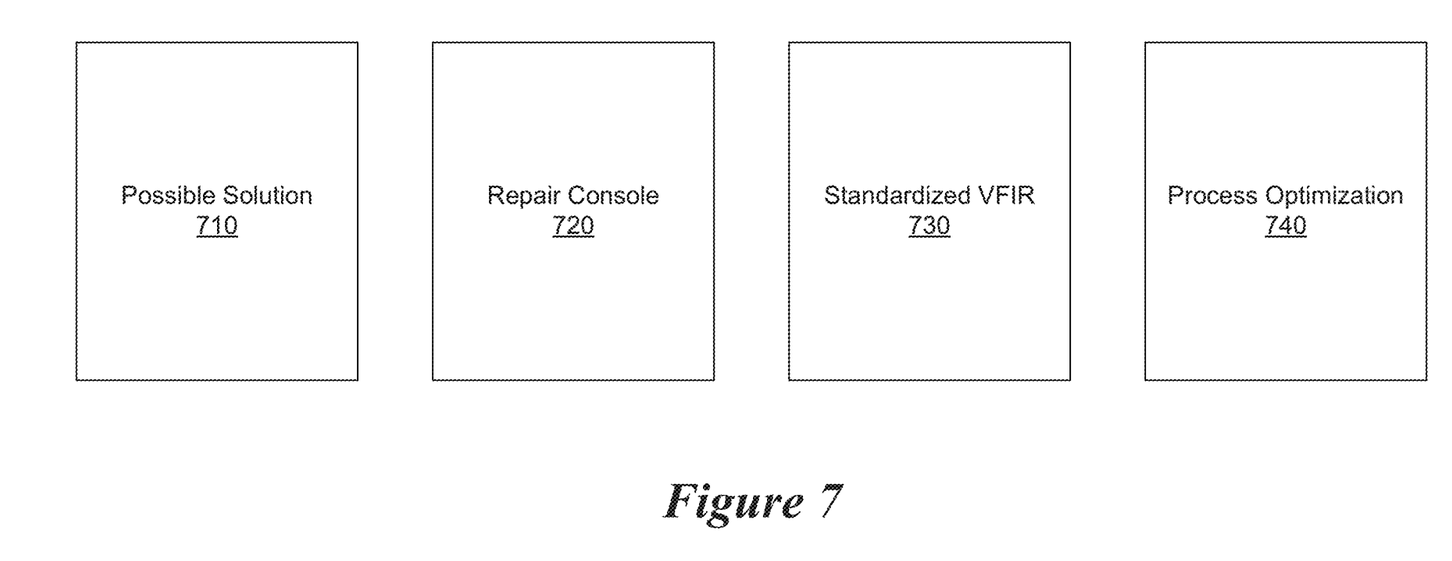
FIG. 7 shows a block diagram of output definitions of a failure identification operation.

Referring to FIG. 7, a block diagram of output definitions 700 of a failure identification operation is shown. More specifically, the output definitions 700 include possible solution output definitions 710, repair console output definitions 720, standardized verified field incident rate (VFIR) reporting output definitions 730 and process optimization output definitions 740.

The possible solution output definitions 710 include electronic depot traveler output definitions, suspected failure modes and module output definitions and predictions output definitions. The prediction output definitions predict components that are close to failure for possible replacement. The repair console output definitions 720 include targeted diagnostics output definitions and system historical information output definitions. The standardized VFIR reporting output definitions 730 include global data analysis output definitions. The global data analysis output definitions enable the system failure identification operation to more effectively analyze global data (both inputs and outputs) and to reduce repeat return rate (RRR). The process optimization output definitions 740 include efficiency improvement output definitions, error removal output definitions and process redundancy reduction output definitions.

Figure 8:
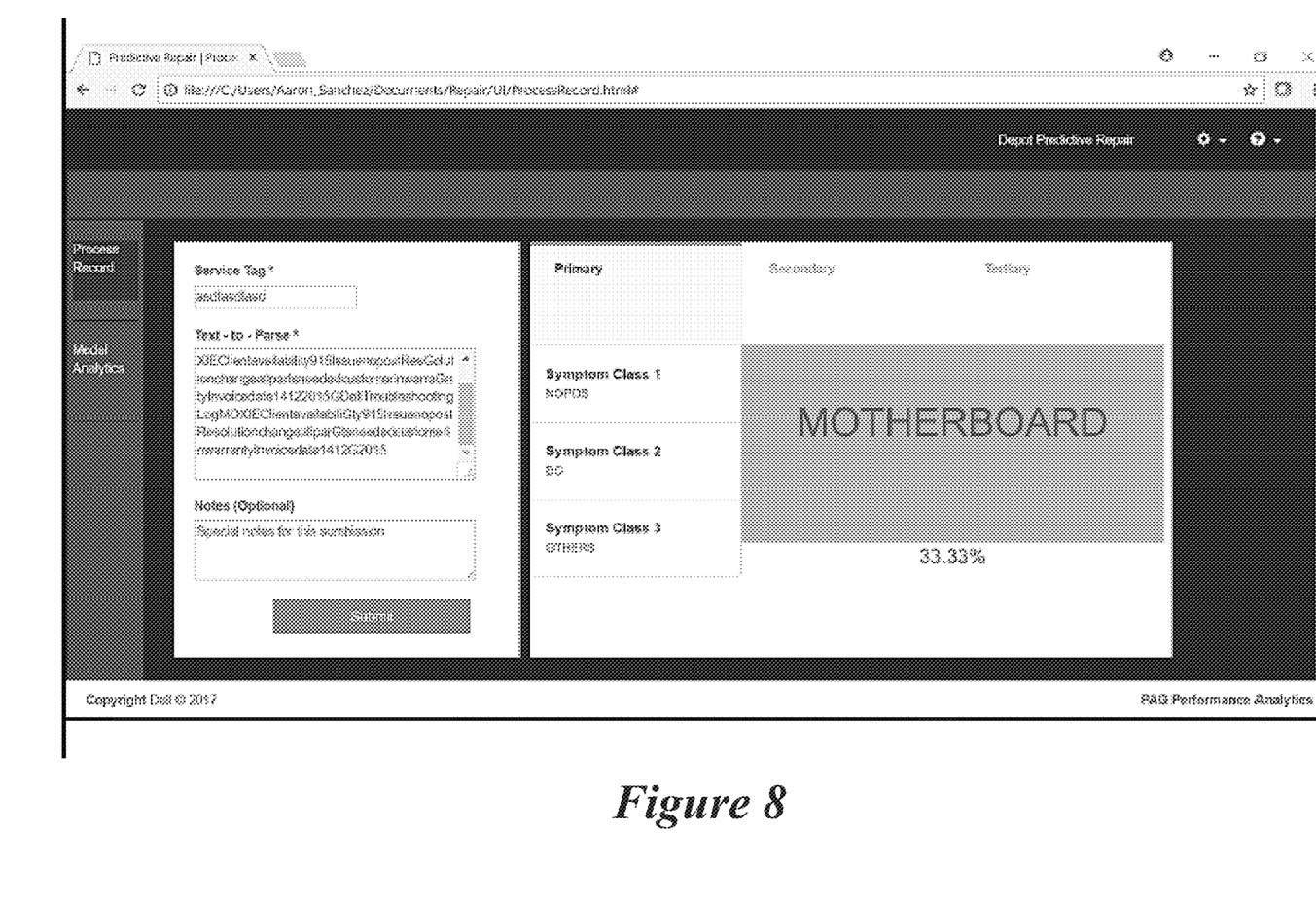
FIG. 8 shows an example screen presentation of a system failure identification user interface.

Referring to FIG. 8, an example screen presentation of a system failure identification user interface 800 is shown.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a system failure identification operation, comprising:
receiving information regarding a device in a repair depot;
performing a depot triage process on the device, the depot triage recording possible causal factors contributing to failure of the device, the possible causal factors being identified based upon technical support personnel accessing prior troubleshooting steps;
determining suspected failures associated with the device based upon symptoms exhibited by the device;
identifying underlying patterns in causal factors and customer complaints using text mining analytics;
correlating the suspected failures with part commodities for use in repairing the device; and,
performing a machine-learning operation to direct repair operations, the machine learning operation providing information to a system failure identification user interface to allow the system failure identification user interface to provide information regarding symptom classification, correlation of systems with part commodities and part commodity recommendations to assist in directing repair operations.

2. The method of claim 1, wherein:
the text mining analytics identify specific symptoms associated with the device.

3. The method of claim 1, further comprising:
presenting a system failure identification user interface, the system failure identification user interface providing information regarding symptom classification, correlation of symptoms with commodities and commodity recommendations to assist in directing repair operations.

4. The method of claim 1, wherein:
possible causal factors contributing to a device failure are accessed via a function command.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving information regarding a device in a repair depot;
performing a depot triage process on the device, the depot triage recording possible causal factors contributing to failure of the device, the possible causal factors being identified based upon technical support personnel accessing prior troubleshooting steps;
determining suspected failures associated with the device based upon symptoms exhibited by the device;
identifying underlying patterns in causal factors and customer complaints using text mining analytics;
correlating the suspected failures with part commodities for use in repairing the device; and
performing a machine-learning operation to direct repair operations, the machine learning operation providing information to a system failure identification user interface to allow the system failure identification user interface to provide information regarding symptom classification, correlation of systems with part commodities and part commodity recommendations to assist in directing repair operations.

6. The system of claim 5, wherein:
the text mining analytics identify specific symptoms associated with the device.

7. The system of claim 5, wherein the instructions executable by the processor are further configured for:
presenting a system failure identification user interface, the system failure identification user interface providing information regarding symptom classification, correlation of symptoms with commodities and commodity recommendations to assist in directing repair operations.

8. The system of claim 5, wherein:
possible causal factors contributing to a device failure are accessed via a function command.

9. A non-transitory, computer-readable storage medium embodying computer program code, the computer program code comprising computer executable instructions configured for:
receiving information regarding a device in a repair depot;
performing a depot triage process on the device, the depot triage recording possible causal factors contributing to failure of the device, the possible causal factors being identified based upon technical support personnel accessing prior troubleshooting steps;
determining suspected failures associated with the device based upon symptoms exhibited by the device;
identifying underlying patterns in causal factors and customer complaints using text mining analytics;
correlating the suspected failures with part commodities for use in repairing the device; and,
performing a machine-learning operation to direct repair operations, the machine learning operation providing information to a system failure identification user interface to allow the system failure identification user interface to provide information regarding symptom classification, correlation of systems with part commodities and part commodity recommendations to assist in directing repair operations.

10. The non-transitory, computer-readable storage medium of claim 9, wherein:
the text mining analytics identify specific symptoms associated with the device.

11. The non-transitory, computer-readable storage medium of claim 9, wherein the computer executable instructions are further configured for:
presenting a system failure identification user interface, the system failure identification user interface providing information regarding symptom classification, correlation of symptoms with commodities and commodity recommendations to assist in directing repair operations.

12. The non-transitory, computer-readable storage medium of claim 9, wherein:
possible causal factors contributing to a device failure are accessed via a function command.

13. The non-transitory, computer-readable storage medium of claim 9, wherein:

the computer executable instructions are deployable to a client system from a server system at a remote location.

14. The non-transitory, computer-readable storage medium of claim 9, wherein:
the computer executable instructions are provided by a service provider to a user on an on-demand basis.

\* \* \* \* \*